United States Patent
Juncu

(10) Patent No.: US 6,731,482 B2
(45) Date of Patent: May 4, 2004

(54) GROUND FAULT CIRCUIT INTERRUPTER

(75) Inventor: Gheorghe Jack Juncu, Simi Valley, CA (US)

(73) Assignee: Gary Szerman, Simi Valley, CA (US)

( * ) Notice: Subject to any disclaimer, the term of this patent is extended or adjusted under 35 U.S.C. 154(b) by 568 days.

(21) Appl. No.: 09/756,826

(22) Filed: Jan. 9, 2001

(65) Prior Publication Data

US 2002/0089799 A1 Jul. 11, 2002

(51) Int. Cl.⁷ .................................................. H02H 3/00
(52) U.S. Cl. .............................. 361/42; 361/44; 361/45
(58) Field of Search .......................... 361/42, 44, 45, 361/115, 78, 79

(56) References Cited

U.S. PATENT DOCUMENTS

| | | | | |
|---|---|---|---|---|
| 3,585,452 A | * | 6/1971 | Goodwin | 361/44 |
| 3,723,813 A | | 3/1973 | Allen | 317/18 B |
| 3,848,159 A | | 11/1974 | Nye, Jr. et al. | 317/180 |
| 4,216,515 A | | 8/1980 | Van Zeeland | 361/45 |
| 4,268,885 A | | 5/1981 | Williams | 361/45 |
| 5,270,897 A | | 12/1993 | McDonald et al. | 361/45 |
| 5,309,310 A | | 5/1994 | Baer et al. | 361/42 |
| 5,381,294 A | | 1/1995 | Konishi | 361/18 |
| 5,416,692 A | | 5/1995 | Shimizu et al. | 363/98 |
| 5,420,740 A | | 5/1995 | MacKenzie et al. | 361/43 |
| 5,490,030 A | | 2/1996 | Taylor et al. | 361/45 |
| 5,666,255 A | | 9/1997 | Muelleman | 361/111 |
| 5,793,587 A | | 8/1998 | Boteler | 361/42 |
| 5,825,599 A | | 10/1998 | Rosenbaum | 361/45 |
| 5,835,322 A | | 11/1998 | Smith et al. | 361/45 |
| 6,031,699 A | | 2/2000 | Dollar, II et al. | 361/92 |
| 6,084,758 A | | 7/2000 | Clarey et al. | 361/62 |
| 6,111,732 A | | 8/2000 | Beland | 361/42 |
| 6,359,761 B1 | * | 3/2002 | Sid | 361/42 |
| 6,522,033 B1 | * | 2/2003 | Nevo | 307/125 |

* cited by examiner

Primary Examiner—Stephen W. Jackson
(74) Attorney, Agent, or Firm—Cook, Alex, McFarron, Manzo, Cummings & Mehler, Ltd.

(57) ABSTRACT

A sensing configuration for a ground fault circuit interrupter for devices having an internal or floating ground electrically isolated from an external ground. The sensor includes a conductor connected to the internal or floating ground so that EMF and leakage current are detected, thus preventing the ground fault circuit interrupter from tripping due to signals caused only by EMF and leakage current in the load circuit.

13 Claims, 1 Drawing Sheet

GROUND FAULT CIRCUIT INTERRUPTER

FIELD OF THE INVENTION

The present invention is directed to detecting and interrupting ground faults in circuits having a grounded load. Specifically, a ground fault circuit interrupter (GFCI) is provided that differentiates between ground faults and leakage and electromagnetic interference (EMI) induced currents generated in the load circuit and returned to the source through ground.

BACKGROUND OF THE INVENTION

GFCI devices are intended to detect and interrupt potentially harmful ground fault currents. GFCI devices work well for this purpose unless electromagnetic interference or voltage transient leakages also set off the GFCI device. In these cases, the interference or transients cause a current sensor to detect in the phase lines a current that reaches or exceeds the trip setting of the ground fault interrupter, causing it to falsely activate in the absence of an actual fault.

In certain applications (such as aircraft devices and appliances) a secondary ground wire provides a path to ground for EMI or transient leakage currents. This path reduces the risk that such transients may pose to aircraft passengers and crew. The threshold for such a GFCI circuit has to be set so high to avoid false trips that a person in direct contact with such equipment could receive a fatal electrical shock. Trip voltages over 8 Milliamps are considered fatal. Typical transient voltages found in IFE applications exceed 20 Milliamps.

Underwriters' Laboratories has studied the ground fault phenomenon and has issued UL 943, Category A as the standard for GFCI devices that protect human life for 50/60 cycle AC power systems. According to this standard, the minimum level for a dangerous ground fault current is 6 milliamps. The ability to distinguish leakage currents from ground fault currents in these applications is paramount. Electrical systems where individual equipment is required to have an attachment to system ground (such as aircraft devices and appliances) are inherently more difficult to monitor.

The concept of a ground fault circuit interrupter using a current transformer is not new. Such a transformer detects the current differential between the line and neutral wires. This detector may be used in both single phase and three phase AC power systems. Any leakage current, ground fault current or the sum thereof is interpreted as a ground fault occurrence.

U.S. Pat. No. 5,793,587 (Boteler) discloses a dual trip level ground fault interrupter having an equipment current transformer and a personnel current transformer. The personnel transformer is more sensitive to fault currents than the equipment transformer. An equipment ground conductor passes through the personal transformer but not through the equipment transformer. While the differential current transformer responds to any leakage current not returning on the ground conductor, the electrical circuit for the load is ungrounded. The Boteler configuration is thus inapplicable for devices having a grounded load (such as aircraft devices and appliances) for preventing electrical shock.

Thus, there exists in the art the need for a ground fault circuit interrupter that is sensitive to ground faults but nonresponsive to leakage and electromagnetic interference currents in systems having a grounded load.

SUMMARY OF THE INVENTION

The present invention is directed to an apparatus and method for detecting a ground fault in a grounded load circuit having a floating ground and powered through at least one line conductor and a neutral conductor. The system comprises a first load terminal for receiving a conductor connected to the floating ground, a second load terminal for receiving the neutral conductor, and a set of third load terminals for receiving at least one line conductor. A first source terminal is provided for receiving a conductor connected to absolute ground, a second source terminal is provided for receiving a conductor connected to the neutral of the power source, and a set of third source terminals are provided for receiving a set of source conductors connected to each source conductor.

A current sensor senses the current in a set of conductors that connect, respectively, the first load terminal and the first source terminal, the second load terminal and second source terminal, and the third load terminals and set of third source terminals.

The present invention may be particularly useful as a resettable ground fault responsive interrupt circuit for a 400 Hz aircraft electrical system. Such a system may comprise an AC input from the aircraft electrical system and a floating ground conductor for connection to the floating ground of a device. A current imbalance sensor is connected to the AC input and the floating ground conductor for generating an imbalance output signal in response to a ground fault in the aircraft electrical system.

DETAILED DESCRIPTION OF THE PREFERRED EMBODIMENT

Figure 1:
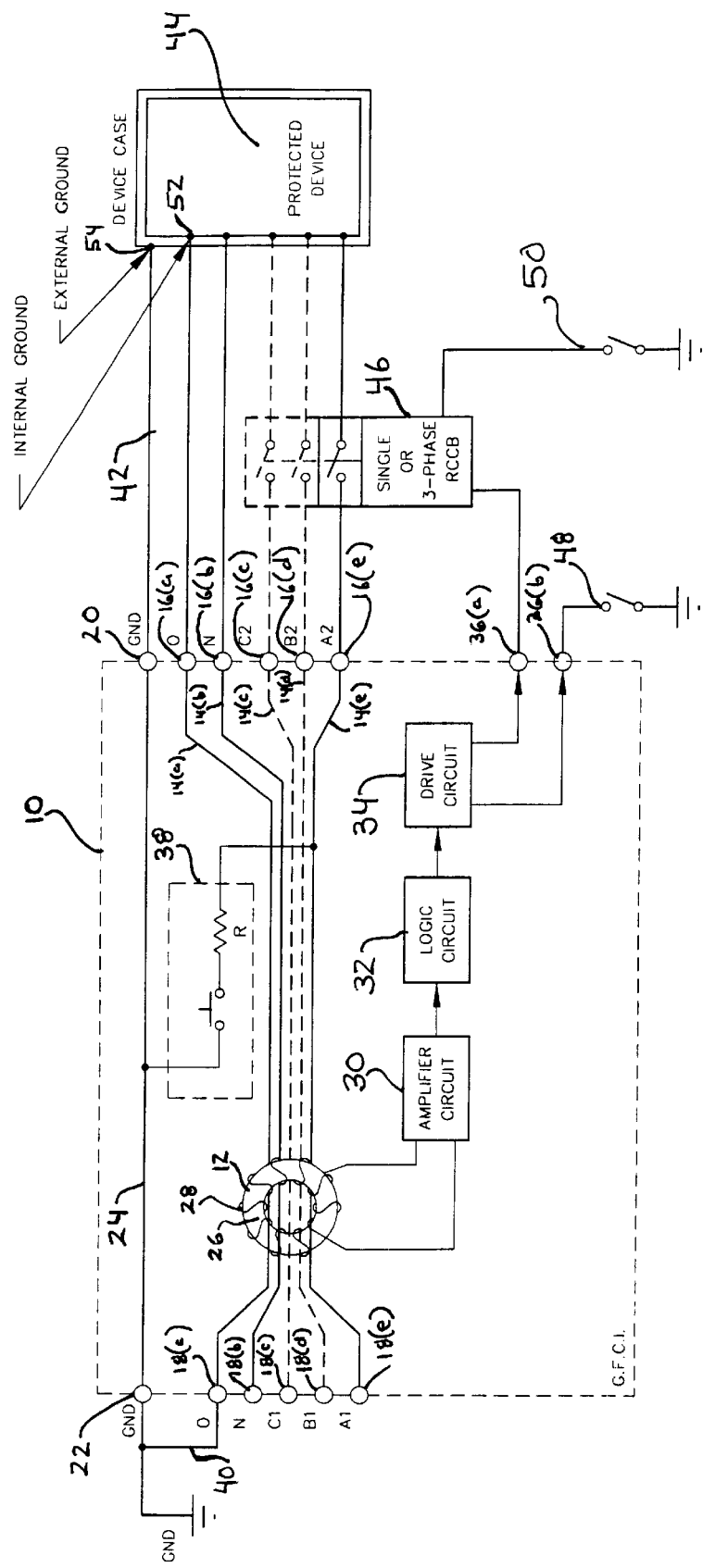
FIG. 1 is a block diagram of a preferred ground fault circuit interrupter of the present invention shown with select devices connected thereto

A ground fault circuit interrupter (GFCI) 10 constructed in accordance with the present invention is illustrated in FIG. 1. The GFCI 10 comprises a current sensor 12 having a plurality of conductors 14($a$)–14($e$) passing therethrough. Each conductor is connected to one of a plurality of first terminals 16($a$)–16($e$) and a respective one of a plurality of second terminals 18($a$)–18($e$). The preferred GFCI 10 also includes a first ground terminal 20 and a second ground terminal 22. The ground terminals 20 and 22 are connected by a conductor 24.

The current sensor 12 of the preferred embodiment comprises a toroid having a core 26 and winding 28 The winding 28 has first and second terminals. The terminals are input to an amplifier circuit 30 The amplifier circuit 30 has an output conductor connected to a logic circuit 32. The logic circuit 32 provides an output to a drive circuit 34. Two output terminals of the drive circuit 34 are connected to GFCI output terminals 36($a$) and 36($b$). The GFCI also preferably includes a test circuit 38, discussed below.

Output terminal 18($a$) is configured for connection to a conductor 40 directly connected to system ground. Output terminal 18($b$) is configured for connection to the neutral conductor of a single or three phase power source. Output terminal 18($e$) is configured for connection to the line conductor of a single phase power source and (optionally) output terminals 18($c$)–18($e$) are configured for connection to the line conductors of a three phase power source.

Input terminal 20 is configured for connection to a conductor 42 connected directly to the case of a protected device 44. Input terminal 16(a) is configured for connection to a conductor connected to ground of the load circuit, i.e., of the protected device. Input terminal 16(b) is configured for connection to the neutral conductor of a single or three phase load circuit. Input terminal 16(e) is configured for connection to the line conductor of a single phase load circuit and (optionally) input terminals 16(c)–16(e) are configured for connection to the line conductors of a three phase load circuit. As illustrated, the line conductors (for either single or three phase) include a relay circuit 46 operating under control of drive circuit 34. In an alternate embodiment, the relay circuit 46 is integrated in the GFCI 10.

In the present embodiment, the relay circuit 46 operates under control of drive circuit 34 and is connected thereto at output terminal 36(a). Drive circuit 34 is also preferably in communication with an external circuit breaker 48. The drive circuit 34 provides a signal for tripping the circuit breaker 48 when the drive circuit opens the line conductor(s) in relay 46, thereby providing an indication of the operational status of relay 46. Drive circuit 34 is also preferably configured for receiving a signal from the circuit breaker 48 when it is reset, signaling the drive circuit 34 to reset line relay 46.

A second circuit breaker 50 is also preferably provided for protecting the system from voltage overload.

The GFCI of the present invention is specifically configured for a protected device 44 (of the prior art) having an internal (load circuit) ground 52 isolated from an external (system) ground 54 Typically, the internal ground 52 will comprise a floating ground of the load circuit and the external ground 54 will comprise the casing or chassis of the protected device. The external ground 54 is further connected to equipment ground, i.e., absolute ground of the system (such as the fuselage of an aircraft). It should be noted that in this design of the prior art, the internal ground is electrically isolated from the external ground to prevent load circuit leakage current from passing or flowing to ground. Such currents will thus not generate hazardous voltages at the casing or chassis. Because leakage currents are detected by the current sensor of the present invention, such currents will not trip the GFCI.

The GFCI of the present invention is thus configured for detecting only an insulation failure or a short circuit from the load circuit to external ground. Because transient leakages pass through the current sensor, the sensor may be set to detect currents at 6 milliamps or lower, thus satisfying the Underwriters Laboratories standard, while greatly reducing false ground fault trips.

As is well known in the art, in response to sensing a current imbalance through the toroid, the toroid generates a voltage differential between its output conductors. The output of the toroid is preferably provided to an amplifier circuit 30 for conditioning the voltage signal for input to a logic circuit 32. The logic circuit 32 provides an output signal for controlling drive circuit 34.

In the preferred embodiment, the drive circuit 34 provides an output signal for controlling a circuit breaker (which may be a remote control circuit breaker) 46. If a ground fault condition is detected, the circuit breaker 46 is activated and opens the conductive path between the line conductors (single or three phase) of the electric load and the source. Preferably, the drive circuit 34 also generates a multiple purpose status output signal for indicating the status of the circuit breaker 46. A status output signal may be implemented on computerized power systems or on systems that require built-in test equipment (BITE) features. The drive circuit 34 may also generate a signal for input to a circuit breaker 48, the status of which may indicate the status of the circuit breaker 46. The drive circuit 34 is also preferably configured to reset the line circuit breaker 46 by resetting circuit breaker 48 The reset switch 48 may be connected to a plurality of GFCI 10, so that only one reset switch need be activated for resetting a plurality of relays. An additional circuit breaker 50 is provided for providing overload protection for the line conductor(s).

The GFCI of the present invention also preferably includes a test circuit 38. Test circuit 38 includes a pushbutton switch for selectively establishing a conductive path between a line conductor and system ground, for simulating a short circuit condition in the system.

In an alternate embodiment, the drive circuit 34 communicates with the line relay 46, and the circuit breaker 48 via wireless communication. In this embodiment, the terminals 36(a) and 36(b) may be replaced by infrared emitters/receivers (driven by drive circuit 34) for establishing communication channels to line relay 46 and circuit breaker 48, also configured for wireless communication, in accord with methods well known in the art.

The present invention has been described in the context of a preferred and alternate embodiments, as well as a system into which the invention may be incorporated. It is apparent to those skilled in this art, however, that modifications and variations to the disclosed embodiments can be made without departing from the spirit and scope of the invention. Accordingly, this invention is to be construed and limited only by the scope of the appended claims

I claim:

1. A method for detecting a ground fault in a grounded load circuit having an internal floating ground and an external case ground, said load circuit powered through at least a pair of conductors, said method comprising the steps of:

establishing a maximum allowable ground fault current magnitude threshold;

providing a first conductor between the floating ground in the load circuit and absolute ground;

providing a second conductor between the case ground and absolute ground;

detecting the aggregate of currents in said pair of conductors and said first conductor; and generating a ground fault signal indicative of a ground fault when said aggregate exceeds said current magnitude threshold.

2. The method of claim 1 further comprising the steps of:

amplifying said ground fault signal and providing said amplified ground fault signal to a logic circuit; and providing control signals from said logic circuit to a drive circuit for controlling the operation of a relay circuit for interrupting the supply of power to said grounded load circuit.

3. The method of claim 2 further comprising the steps of:

providing at a remote location a reset switch for said drive circuit for receiving a first infrared signal generated by said drive circuit for indicating the status of said relay circuit and for generating a second infrared signal for directing said drive circuit to reset said relay circuit.

4. An apparatus for detecting a ground fault in a grounded load circuit having a floating ground and powered through at least one line conductor and a neutral conductor, said apparatus comprising:

a first load terminal for receiving a conductor connected to said floating ground, a second load terminal for receiving said neutral conductor, and a set of third load terminals for receiving said at least one line conductor;

a first source terminal for receiving a conductor connected to absolute ground, a second source terminal for receiving a conductor connected to the neutral of the power source, and a set of third source terminals for receiving a set of source conductors connected to each source conductor; and a current sensor for sensing the current in a set of conductors consisting of:
  a first conductor connected between said first load terminal and said first source terminal;
  a second conductor connected between said second load terminal and said second source terminal; and
  a third set of conductors connected between said set of third load terminals and said set of third source terminals.

5. The apparatus of claim 4 wherein said at least one line conductor comprises first, second, and third line conductors for transmitting three-phase power to said grounded load circuit.

6. The apparatus of claim 4 wherein said current sensor comprises a differential transformer having a pair of output terminals.

7. The apparatus of claim 6, further comprising:
  an amplifier circuit for receiving via said pair of output terminals a voltage difference and providing an amplifier output signal indicative thereof;
  a logic circuit for receiving said amplifier output signal and providing a drive circuit control signal;
  a drive circuit for receiving said drive circuit control signal and providing a relay control signal.

8. The apparatus of claim 7, further comprising:
  a reset switch located at a remote location for providing a signal for input to said drive circuit for directing said drive circuit to provide a relay reset control signal.

9. A resettable ground fault responsive interrupt circuit for a load in a 400 Hz aircraft electrical system having an aircraft ground, said load having an inner floating ground and an external case ground, said circuit comprising:
  an AC input from said aircraft electrical system;
  an external ground conductor for connection between the external case ground and aircraft ground;
  a floating ground conductor for connection to the floating ground of said load; and
  a current imbalance sensor connected to said AC input and said floating ground conductor for generating an imbalance output in response to a ground fault in said aircraft electrical system, wherein said external ground conductor passes outside said current imbalance sensor.

10. The circuit of claim 9, further comprising:
  a relay for disconnecting said AC input from a load in response to receiving an imbalance output signal.

11. The circuit of claim 10, further comprising:
  a remotely located reset button for selectively providing to said relay a signal for reconnecting said AC input to said load.

12. The circuit of claim 11 wherein said reset button is connected to a plurality of ground fault responsive interrupt circuits for resetting a plurality of relays.

13. A ground fault circuit interrupter for use in protecting a load of the type having an internal floating ground and an external case ground, comprising:
  a first conductor connected to said internal floating ground;
  a second conductor connected to said external case ground;
  at least a pair of supply conductors for supplying power from a power source to said load;
  a current sensor for detecting the aggregate current in said at least pair of supply conductors and said first conductor; and
  wherein said second conductor passes outside the current sensor.

* * * * *